US009444695B2

(12) United States Patent
Dutta et al.

(10) Patent No.: US 9,444,695 B2
(45) Date of Patent: Sep. 13, 2016

(54) METHODS AND SYSTEMS FOR SCHEDULING A TASK

(71) Applicant: Xerox Corporation, Norwalk, CT (US)

(72) Inventors: Partha Dutta, Bangalore (IN); Tridib Mukherjee, Bangalore (IN); Koustuv Dasgupta, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 14/168,228

(22) Filed: Jan. 30, 2014

(65) Prior Publication Data

US 2015/0215173 A1     Jul. 30, 2015

(51) Int. Cl.
| | | |
|---|---|---|
| *G06F 15/16* | (2006.01) | |
| *H04L 12/24* | (2006.01) | |
| *G06F 9/50* | (2006.01) | |
| *G06F 9/48* | (2006.01) | |

(52) U.S. Cl.
CPC ......... *H04L 41/5016* (2013.01); *G06F 9/4881* (2013.01); *G06F 9/505* (2013.01); *G06F 9/5038* (2013.01); *H04L 41/0896* (2013.01); *G06F 2209/503* (2013.01)

(58) Field of Classification Search
CPC ..................... H04L 41/5016; H04L 41/0896; G06F 9/4881; G06F 9/5038
USPC ................................ 709/201, 202, 217, 219
See application file for complete search history.

(56) References Cited

U.S. PATENT DOCUMENTS

| | | | | |
|---|---|---|---|---|
| 2005/0080658 A1* | 4/2005 | Kohn | ..................... | G06Q 10/04 705/7.14 |
| 2009/0198792 A1* | 8/2009 | Wittenschlaeger | ....... | G06F 9/54 709/215 |
| 2014/0122706 A1* | 5/2014 | Boerner | .................. | H04L 41/12 709/224 |

OTHER PUBLICATIONS

Anderson, D. (2009). Celebrating Diversity in Volunteer Computing. Hawaii International International Conference on Systems Science (HICSS-42).
Toth, D. (2007). Characterizing Resource Availability for Volunteer Computing and its Impact on Task Distribution Methods. WSEAS Int. Conf. on Software Engineering, Parallel and Distributed Systems.
Zhang, J. (2009). Job-Scheduling with Resource Availability Prediction for Volunteer-Based Grid Computing. London Communications Symposium.
Lin, H. (2010). Moon: MapReduce on Opportunistic eNvironments. International Symposium on High Performance Distributed Computing (HPDC). ACM.

(Continued)

*Primary Examiner* — Viet Vu (57) ABSTRACT

Disclosed are the methods for scheduling a task including at least one sub-task, on one or more computing devices in a distributed computing environment. A set of computing devices are identified from the one or more computing devices, based on an availability of a set of computational resources on the set of computing devices. Each computing device in the set of computing devices is ranked based on at least one of a monetary cost or a network cost, associated with the execution of the at least one sub-task on the each computing device. The at least one sub-task is allocated to at least one computing device from the set of computing devices for execution based on at least one of the ranking or an acceptable success probability associated with the execution of the at least one sub-task.

22 Claims, 6 Drawing Sheets

(56) References Cited

OTHER PUBLICATIONS

Broberg, J. (2008). Market-oriented Grids and Utility Computing: The State-of-the-art and Future Directions. Springer J. Grid Comput.

Rood, B. (2007). Multi-State Grid Resource Availability Characterization. IEEE/ACM International Conference on Grid Computing.

Khoo Boon Tat, B. (2010). Pro-active failure handling mechanisms for scheduling in grid computing environments. J. Parallel Distrib. Comput.

* cited by examiner

METHODS AND SYSTEMS FOR SCHEDULING A TASK

TECHNICAL FIELD

The presently disclosed embodiments are related, in general, to a distributed computing network. More particularly, the presently disclosed embodiments are related to methods and systems for scheduling tasks on one or more computing devices.

BACKGROUND

Advancements in the field of virtualization and shared computing have led to the development of distributed computing. Distributed computing may enable users to process one or more tasks on one or more remote computing devices. Such remote computing devices may include one or more computational resources that are rented by the users. Some examples of distributed computing may include, but are not limited to, cloud computing and volunteer computing. Cloud computing involves maintaining a cloud computing infrastructure that may further include a data center having one or more computational resources. These computational resources may be allocated to a user to process the one or more tasks. Examples of the computational resources may include, but are not limited to, one or more processor instances, storage space, and random access memory (RAM) space.

Volunteer computing is a type of distributed computing, in which maintaining the data center having the one or more computational resources may not be required. Such cloud-computing infrastructure may include a marketplace server and one or more volunteer computing devices. The one or more volunteer computing devices may share one or more respective computational resources with the marketplace server. The marketplace server may utilize the shared one or more computational resources to execute applications and projects by transmitting the applications and projects to the corresponding volunteer computing devices for execution. The execution of the selected application and project may be halted when the shared one or more computational resources are needed to execute some other application on the respective volunteer computing device. Thus, processing of the selected application and project may be hampered. Hence, maintaining service level agreements (SLAs) for execution of the projects and applications in volunteer computing infrastructures may be difficult.

SUMMARY

According to embodiments illustrated herein there is provided a method for scheduling a task including at least one sub-task, on one or more computing devices in a distributed computing environment. The method includes identifying, by one or more processors, a set of computing devices from the one or more computing devices, based on an availability of a set of computational resources on the set of computing devices. The set of computational resources are required to execute the at least one sub-task. The method further includes ranking, by the one or more processors, each computing device in the set of computing devices based on at least one of a monetary cost or a network cost, associated with the execution of the at least one sub-task on the each computing device. The at least one sub-task is allocated to at least one computing device from the set of computing devices for execution based on at least one of the ranking or an acceptable success probability associated with the execution of the at least one sub-task, wherein the acceptable success probability corresponds to a service level agreement parameter associated the task.

According to embodiments illustrated herein there is provided a system for scheduling a task including at least one sub-task, on one or more computing devices in a distributed computing environment. The system includes one or more processors configured to determine a weight parameter for the at least one sub-task based on at least one of a set of computational resources required to execute the at least one sub-task or a first time duration required to execute the at least one sub-task. The one or more processors are further configured to identify a set of computing devices from the one or more computing devices, based on an availability of the set of computational resources on the set of computing devices. Furthermore, the one or more processors are configured to rank each computing device in the set of computing devices based on at least one of a monetary cost or a network cost, associated with the execution of the at least one sub-task on the each computing device, wherein the monetary cost and the network cost are determined based on the weight parameter. Finally, the one or more processors are configured to allocate the at least one sub-task to at least one computing device from the set of computing devices for execution based on at least one of the ranking or an acceptable success probability associated with the execution of the at least one sub-task, wherein the acceptable success probability corresponds to a service level agreement parameter associated the task.

According to embodiments illustrated herein there is provided a computer program product for use with a computing device. The computer program product comprising a non-transitory computer readable medium. The non-transitory computer readable medium stores a computer program code for scheduling a task including at least one sub-task, on one or more computing devices in a distributed computing environment. The computer program code is executable by one or more processors in the computing device to identify a set of computing devices from the one or more computing devices, based on an availability of a set of computational resources on the set of computing devices. The set of computational resources are required to execute the at least one sub-task. The computer program code is further executable by one or more processors in the computing device to rank each computing device in the set of computing devices based on at least one of a monetary cost or a network cost, associated with the execution of the at least one sub-task on the each computing device. The computer program code is further executable by one or more processors in the computing device to allocate the at least one sub-task to at least one computing device from the set of computing devices for execution based on at least one of the ranking or an acceptable success probability associated with the execution of the at least one sub-task, wherein the acceptable success probability corresponds to a service level agreement parameter associated the task.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not limit, the scope in any manner, wherein similar designations denote similar elements, and in which.

DETAILED DESCRIPTION

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "at least one embodiment," "an embodiment," "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the respective meanings set forth below.

"Computational resources" correspond to resources utilized for executing a project/application. In an embodiment, the computational resources correspond to, but are not limited to, processor instances, storage space, and RAM space. In an embodiment, the computational resources may further correspond to, but are not limited to, software applications, security services, and database services that can be utilized by the computing devices.

A "Marketplace" refers to a type of e-commerce website where product and inventory information is provided by multiple third parties. Transactions are processed by the marketplace owner. In an embodiment, the online marketplace publishes the availability of the computational resources. Some examples of online marketplace include, but are not limited to, E-bay.com, Amazon.com, Flipkart.com, Amazon web services (AWS), Windows Azure and the like.

A "task" refers to a piece of work, a processor thread, or a set of instructions to be performed. Tasks may necessitate the involvement of one or more computational resources. In an embodiment, the task may include one or more sub-tasks.

"Monetary cost" is a measure of cost associated with utilizing a computing device to execute a task. In an embodiment, the monetary cost corresponds to the cost of using a computational resource for one unit of computing for one unit of time. In an embodiment, the monetary cost associated with a computing device is predefined. For instance, the cost of using 2 CPU of 2 GHz for 1 hour is $0.02.

"Network Cost" corresponds to a network delay in transmitting the task to a volunteer computing device. In an embodiment, the network cost may be determined based on the distance, the number of network hops, and the network bandwidth available between the requester-computing device and the volunteer computing device from the set of volunteer computing devices.

"Payment" refers to a remuneration received by an owner of a computing device for sharing one or more computational resources. The one or more computational resources are utilized for execution of projects/applications. The payment is received based on usage of the one or more computational resources. In an embodiment, the payment is a monetary compensation received by the owner of the computing device. However, a person having ordinary skills in the art would understand that the scope of the disclosure is not limited to remunerating the owner with monetary compensation. In an embodiment, various other means of remunerating the owner may be employed such as, remunerating the owners with lottery tickets, giving gift items, shopping vouchers, and discount coupons. In another embodiment, payment may further correspond to strengthening of the relationship between the owner of the computing device and marketplace server. For example, the marketplace server may provide access to more projects so that the owner has more gain. In addition, the marketplace server may improve the reputation score of the computing device so that more projects are directed to the computing device for execution. A person skilled in the art would understand that combination of any of the above-mentioned means of remuneration could be used for paying the owner of the computing device.

A "beacon signal" refers to a periodic signal that is transmitted by a computing device to the marketplace server indicating availability of the computational resources associated with the computing device. For example, if none of the computational resources is available, the computing device will transmit a beacon signal indicating that none of the computational resources is available. In another embodiment, if the one or more computational resources associated with the computing device are not available, the computing device may not transmit the beacon signal.

A "Service level agreement" refers to an agreement between a requestor and a marketplace that defines various benchmarks that marketplace may have to achieve during execution of a task. In an embodiment, the one or more parameters include computational resource required to process the task, a deadline for completion of the task, a cost of executing the task, or an acceptable success probability of execution of the task. In an embodiment, the cost of executing the task may further include the network cost and the monetary cost.

"Metadata associated with the task" corresponds to additional information that is transmitted along with the task. In an embodiment, the additional information may include, but is not limited to, number of sub-tasks present in the task, duration of execution of each sub-task, computational resource requirement of the task, etc.

"Probability" shall be broadly construed, to include any calculation of probability; approximation of probability, using any type of input data, regardless of precision or lack of precision; any number, either calculated or predetermined, that simulates a probability; or any method step having an effect of using or finding some data having some relation to a probability.

"Probability of successful execution of task" corresponds to a measure of estimation that a task will be executed successfully by the one or more computing devices.

A "cloud-computing infrastructure" corresponds to a universal collection of computational resources (such as computing instances, storage, information hardware, various platforms, and services) over a communication medium (such as internet) and forms individual units within the virtualization environment. In an embodiment, one or more computing devices, registered with the cloud-computing infrastructure, utilize the resources to perform respective operations. In an embodiment, cloud-computing infrastructure may provide one or more services such as, but not limited to, Infrastructure as a service (IaaS), Platform as a service (Paas), Software as a service (SaaS), Storage as a service (STaaS), Security as a service (SECaaS), and Data as a service (DaaS).

Figure 1:
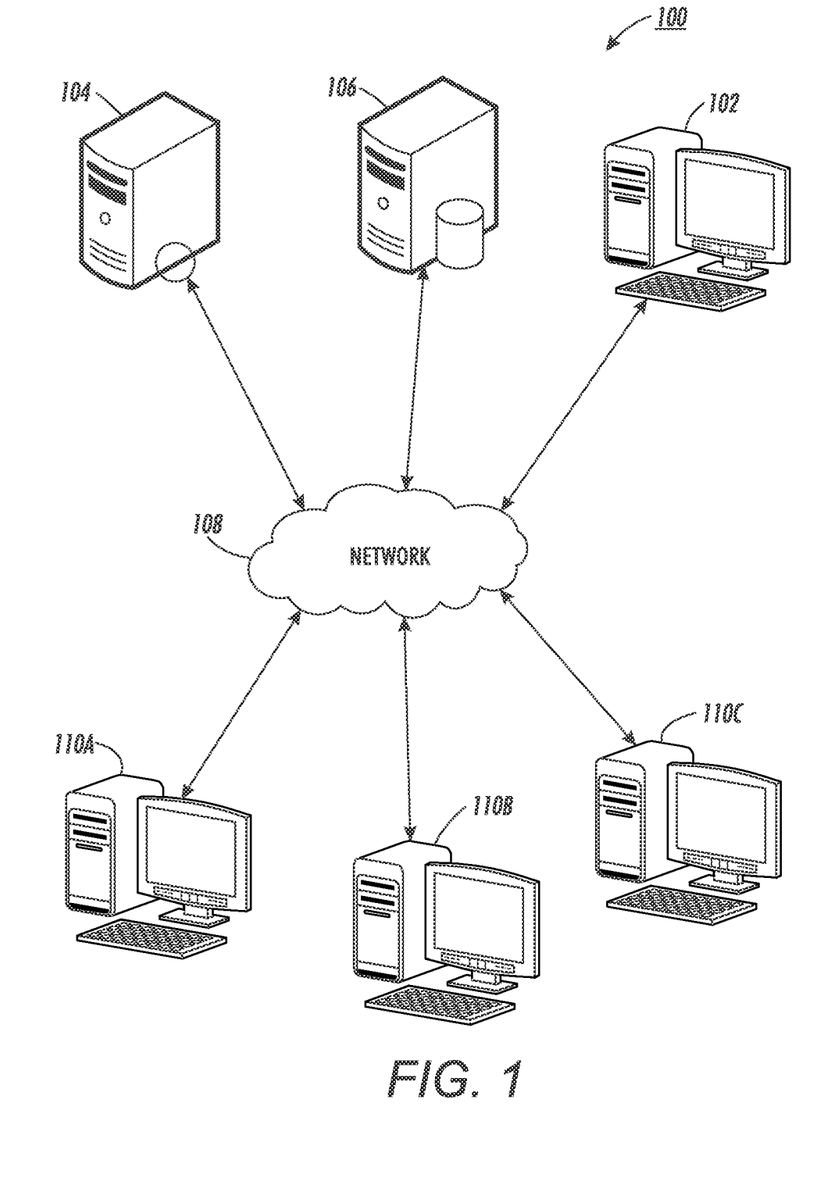
FIG. 1 is a block diagram illustrating a system environment, in which various embodiments can be implemented.

FIG. 1 is a block diagram of a system environment 100, in which various embodiments can be implemented. The system environment 100 includes a requester-computing device 102, a marketplace server 104, a database server 106, a network 108, and one or more volunteer computing devices 110A, 110B, and 110C (hereinafter referred as the volunteer computing devices 110).

In an embodiment, the requester-computing device 102 may not have enough computational power to execute the one or more projects and applications. Thus, the requester-computing device 102 may transmit one or more projects and applications to the marketplace server 104 as one or more tasks to process. In addition, the requester-computing device 102 transmits metadata associated with the one or more tasks to the marketplace server 104. In an embodiment, the metadata may include data to be processed, computational resource requirements for executing a task, and an SLA associated with the task. Examples of the requester-computing device 102 may include, but are not limited to, a personal computer, a laptop, a personal digital assistant (PDA), a mobile device, a tablet, or any other computing device that is capable of transmitting one or more process threads to the marketplace server 104.

The marketplace server 104 maintains a repository containing information that pertains to the availability of the one or more computational resources associated with the volunteer computing devices 110. In an embodiment, the marketplace server 104 receives beacon signal from the one or more volunteer computing devices 110 indicative of availability of the computational resources. In an embodiment, the one or more computational resources associated with each of the volunteer computing devices 110 have an associated cost. In an embodiment, the cost corresponds to at least one of a monetary cost or a network cost associated with the one or more computational resources. The determination of the cost has been described later in conjunction with FIG. 3. Based on the cost associated with each of the one or more computational resources, the marketplace server 104 ranks the respective volunteer computing devices 110. Ranking of the volunteer computing devices 110 has been described later in conjunction with FIG. 6.

The marketplace server 104 receives the one or more tasks and respective metadata from the requester-computing device 102. Based on at least the availability of the one or more computational resources and the SLA, the marketplace server 104 schedules the one or more tasks on at least one volunteer computing device (for example, the volunteer computing device 110A). The scheduling of the one or more tasks has been described later in conjunction with FIG. 6. The marketplace server 104 can be implemented as an application server. Some examples of known application server include, but are not limited to, Java application server, .NET framework, and Base4 application server.

The database server 106 stores information pertaining to the availability of the one or more computational resources. Further, the database server 106 stores the metadata associated with the one or more tasks received by the marketplace server 104. In an embodiment, the database server 106 may receive a query from the marketplace server 104 to extract the availability of the one or more computational resources and the metadata associated with the one or more tasks. The database server 106 may be realized through various technologies such as, but not limited to, Microsoft® SQL server, Oracle, and My SQL. In an embodiment, the marketplace server 104 may connect to the database server 106 by using one or more protocols such as, but not limited to, ODBC protocol and JDBC protocol.

A person having ordinary skill in the art would understand that the scope of the disclosure should not be limited to the database server 106 as a separate entity. In an embodiment, the database server 106 may be contained in the marketplace server 104.

The network 108 corresponds to a medium through which content, messages, and signals flow between various devices of the system environment 100 (e.g., the requester-computing device 102, the marketplace server 104, the database server 106, and the volunteer computing devices 110). Examples of the network 108 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

The volunteer computing devices 110 transmit a beacon message to the marketplace server 104, indicative of the availability of the one or more computational resources. The volunteer computing devices 110 may receive at least one task from the marketplace server 104 based on the availability. The volunteer computing devices 110 process at least one task to generate a result. Further, the volunteer computing devices 110 transmit the result to the marketplace server 104. Examples of the volunteer computing devices 110 include, but are not limited to, a personal computer, a laptop, a personal digital assistant (PDA), a mobile device, a tablet, or any other computing device.

Figure 2:
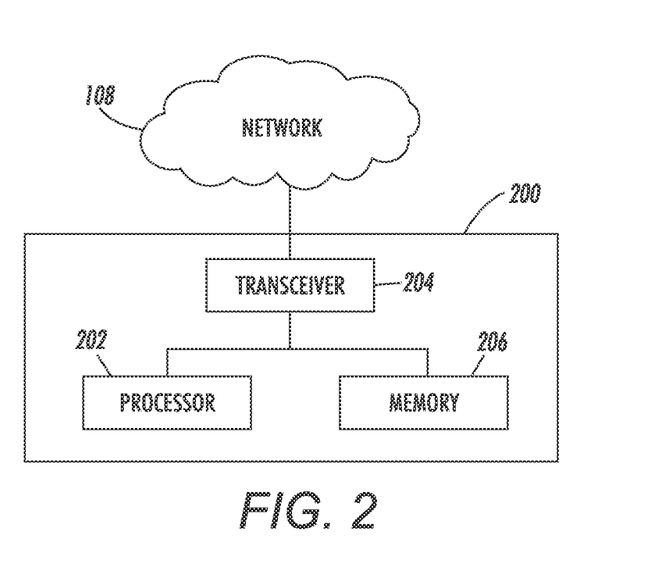
FIG. 2 is a block diagram of a system in accordance with at least one embodiment.

FIG. 2 is a block diagram of the marketplace server 104 in accordance with at least one embodiment. The marketplace server 104 includes a processor 202, a transceiver 204, and a memory 206. The processor 202 is coupled to the transceiver 204 and the memory 206. The transceiver 204 is connected to the network 108.

The processor 202 includes suitable logic, circuitry, and interfaces and is configured to execute one or more instructions stored in the memory 206 to perform predetermined operation on the marketplace server 104. The memory 206 may be configured to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The transceiver 204 transmits and receives messages and data to and from various components of the system environment 100 (e.g., the requester-computing device 102, the database server 106, and the volunteer computing devices 110). Examples of the transceiver 204 may include, but are not limited to, an antenna, an Ethernet port, a universal serial bus (USB) port, or any other port that can be configured to receive and transmit data. The transceiver 204 transmits and receives data and messages in accordance with various communication protocols, such as, TCP/IP, UDP, and 2G, 3G, or 4G communication protocols.

The memory 206 stores a set of instructions and data. Some of the commonly known memory implementations include, but are not limited to, a RAM, a read-only memory (ROM), a hard disk drive (HDD), and a secure digital (SD) card. Further, the memory 206 includes the one or more instructions that are executable by the processor 202 to perform specific operations. It is apparent to a person having ordinary skill in the art that the one or more instructions stored in the memory 206 enable the hardware of the marketplace server 104 to perform the predetermined operation. In an embodiment, the operation of the marketplace server 104 has been described in conjunction with FIG. 3 and FIG. 6.

Figure 3:
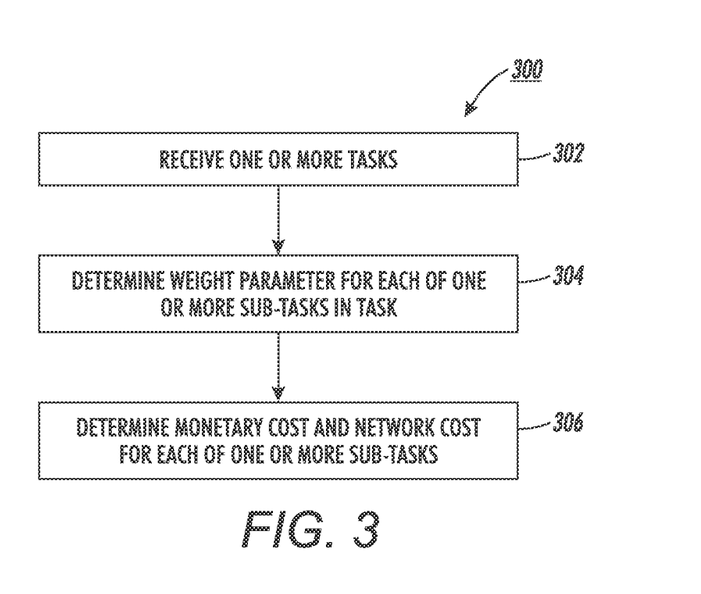
FIG. 3 is a flowchart illustrating a method to determine the cost of executing a task in accordance with at least one embodiment.

FIG. 3 is a flowchart 300 illustrating a method for determining the cost of executing a task in accordance with at least one embodiment. The flowchart 300 is described in conjunction with FIG. 1 and FIG. 2.

At step 302, one or more tasks are received from the requester-computing device 102. In an embodiment, the processor 202 receives the one or more tasks through the transceiver 204. Prior to receiving the one or more tasks, the processor 202 receives the beacon signal from each of the volunteer computing devices 110. In an embodiment, the beacon signal is indicative of the availability of the one or more computational resources associated with the respective volunteer computing devices 110. If a beacon signal is not received from any of the volunteer computing devices 110 (e.g., volunteer computing device 110b), the processor 202, in the marketplace server 104, considers that the one or more computational resources associated with the volunteer computing device 110b are not available. The following table illustrates the status of the one or more computational resources associated with each of the volunteer computing devices 110:

TABLE 1

Status of the one or more computational resources

| Volunteer computing devices | The one or more computational resources | Beacon signal received? | Availability of computational resources |
|---|---|---|---|
| Volunteer computing device 110A | 2.2 GHz dual-core processor<br>2 GB RAM<br>250 GB HDD | Yes | Available |
| Volunteer computing device 110C | 3 GHz single-core processor<br>1 GB RAM<br>160 GB HDD | No | Not Available |
| Volunteer computing device 110C | 2.4 GHz Quad-core processor<br>GPU<br>4 GB RAM<br>500 GB Hard HDD | Yes | Available |

In another embodiment, the processor 202 maintains historical data pertaining to the availability of the one or more computational resources. The processor 202 is configured to generate a probabilistic model based on the historical data, where the probabilistic model is configured to predict the availability of the one or more computational resources. In an embodiment, the processor 202 may utilize one or more techniques known in the art such as, but not limited to, support vector machine (SVM), Bayes classifiers, fuzzy logic, and neural networks to configure the probabilistic model.

In an embodiment, the historical data may be a repository of exact time period for which the one or more computational resources were available in the past. For example, the historical data may be indicative of information that is available for between 3 o'clock and 6 o'clock in the morning for the one or more computational resources associated with the volunteer computing device 100B. The following table illustrates a sample historical data for the volunteer computing device 110B:

TABLE 2

Historical data related to availability of the one or more computational resources

| Time period | Day | Availability |
|---|---|---|
| 3:00 am–6:00 am | Monday | Yes |
| 9:00 am–12:00 pm | Monday | No |
| 3:00 am–6:00 am | Tuesday | Yes |
| 9:00 am–12:00 pm | Tuesday | No |

The probabilistic model may identify a pattern that between 3:00 am and 6:00 am daily, the one or more computational resources associated with the volunteer computing device 110B may be available.

In another embodiment, the processor 202 may correlate the prediction about the availability of the one or more computational resources obtained from the probabilistic model and the beacon signal received from the volunteer computing devices 110 to determine actual availability of the one or more computational resources. For example, the processor 202 may determine, by utilizing the probabilistic model, that the volunteer computing device 110B will have one or more computational resources available between 3 am and 6 am. However, the processor 202 has not received any beacon signal from the volunteer computing device 110b. Hence, the processor 202 may mark the one or more computational resources associated with the volunteer computing device 110B as unavailable.

In an embodiment, the availability of the one or more computational resources is determined for a predetermined fixed time interval. For example, the processor 202 may determine which of the volunteer computing devices 110 have the one or more computational resources available for an hour between 12:00 pm and 1:00 pm. As discussed above, the processor 202 may determine the availability of the one or more computational resources based on the beacon signal received from the volunteer computing device 110A. A person having ordinary skill in the art would understand that the beacon signal is received by the processor 202 prior to the predetermined fixed time interval. For instance, the volunteer computing device 110A would transmit the beacon signal prior to 12:00 pm. The reception of the beacon signal and determining the availability of the one or more computational resources is described later in conjunction with FIG. 4.

Subsequently, the processor 202 receives the one or more tasks. In addition, the processor 202 receives the metadata associated with the one or more tasks along with the one or more tasks. The metadata includes at least the SLA associated with the one or more tasks. In an embodiment, the SLA includes information pertaining to the computational resource requirement of a task, duration of the task, deadline by which the task should be completed, the cost of execution of the task, and required level of service quality in the task.

For the purpose of scheduling the one or more tasks, the processor 202 may divide each of the one or more tasks in one or more sub-tasks. In an embodiment, each of the one or more sub-tasks is executed and processed separately such that the SLA associated with the complete task is not hampered. In an embodiment, each of the one or more sub-tasks has its respective duration of execution.

At step 304, a weight parameter is determined for each of the one or more sub-tasks. In an embodiment, the processor 202 determines the weight parameter. In an embodiment, the processor 202 utilizes following equation to determine the weight parameter:

$$w(j_k) = S(j_k) \cdot L(j_k) \quad (1)$$

where, j corresponds to a task j;

$j_k$ corresponds to a sub-task k in the task j;

$w(j_k)$ corresponds to the weight parameter associated with the sub-task $j_k$;

$S(j_k)$ corresponds to the computational resource requirement vector associated with the task; and $L(j_k)$ corresponds to the duration required to execute the sub-task $j_k$.

A person having ordinary skill in the art would understand that the scope of the disclosure is not limited determining the weight parameter for the one or more sub-tasks. In an embodiment, the processor 202 may determine the weight parameter for each of the one or more tasks by utilizing the equation 1.

At step 306, a monetary cost and a network cost is determined for each of the one or more sub-tasks in each of the one or more tasks. In an embodiment, the processor 202 determines the monetary cost and the network cost. Prior to determining the monetary cost and the network cost, the processor 202 identifies a set of volunteer computing devices from the volunteer computing devices 110 that satisfy the computational resource requirements of the one or more sub-tasks. For example, a sub-task from the one or more sub-tasks requires 2 GHZ processor, 1 GB RAM, and 100 GB HDD. The processor 202 may identify the volunteer computing device 110a and the volunteer computing device 110C (refer Table 1). The identification of the set of volunteer computing devices has been described later in conjunction with FIG. 5.

Thereafter, the processor 202 determines the network cost and the monetary cost for each of the one or more sub-tasks. In an embodiment, the monetary cost corresponds to the cost of using a computational resource for one unit of computing for one unit of time. For example, a task includes two sub-tasks. The first sub-task has a computation requirement of c1 and duration to execute the first sub-task is d1. Similarly, the second sub-task has a computational requirement of c2 and duration to execute the first sub-task is d2. For instance, the first sub-task is executed on volunteer computing device 110A, and the second sub-task is processed on the volunteer computing device 110C. Then, the monetary cost for executing the task is determined by the processor 202 by utilizing the following equation:

Monetary cost for task=

Monetary cost for using volunteer computing device (110a)·c1·d1+Monetary cost for using volunteer computing device (110c)·c2·d2    (2)

In an embodiment, the network cost corresponds to network delay in transmitting the sub-task to the identified set of volunteer computing devices from the requester-computing device 102. In an embodiment, the network cost may determined based on the distance, the number of network hops, and the network bandwidth available, between the requester-computing device 102 and the volunteer computing device from the set of volunteer computing devices. For example, the distance between the requester-computing device 102 and the volunteer computing device 110A is greater than the distance between the requester-computing device 102 and the volunteer computing device 110C. Thus, the latency to send the sub-task to the volunteer computing device 110A is greater than the latency to send the sub-task to the volunteer computing device 110C. Therefore, the network cost associated with the sub-task to be executed on the volunteer computing device 110A is greater than the network cost associated with the sub-task to be executed on the volunteer computing device 110C.

Figure 4:
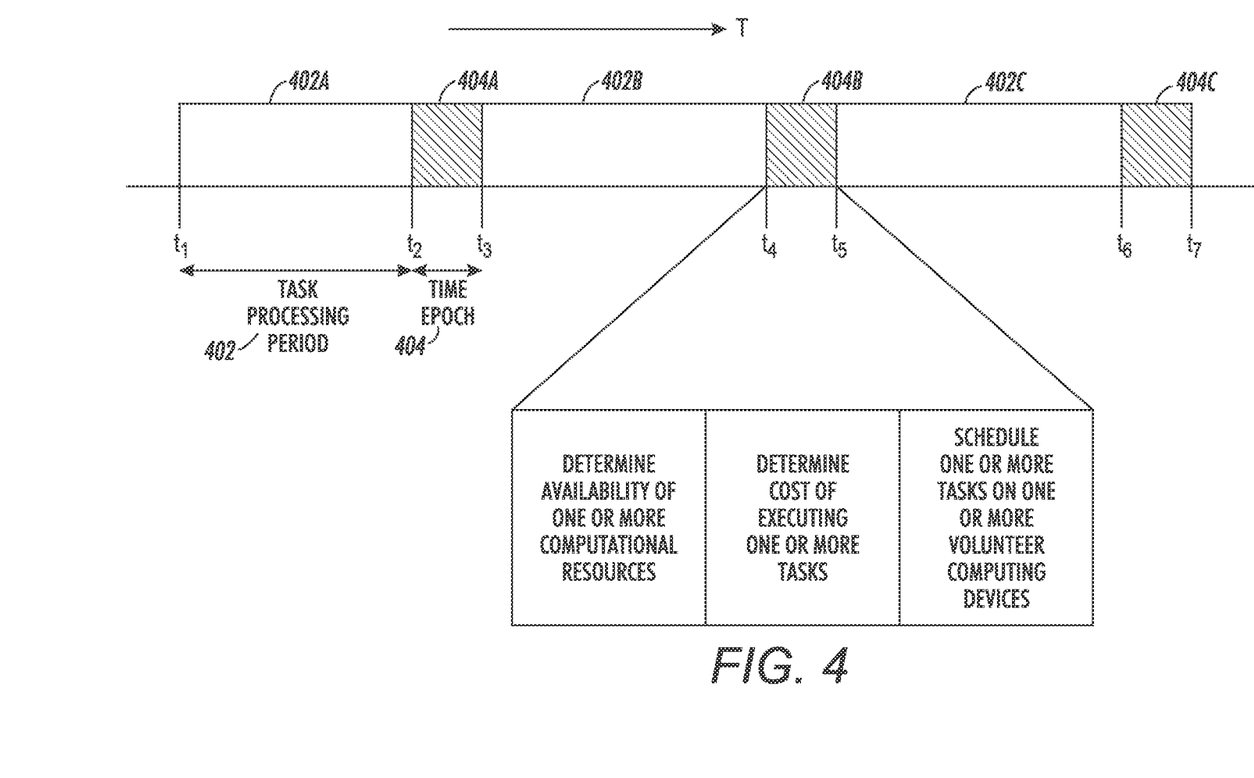
FIG. 4 is a timing diagram indicative of a predetermined time period reserved by the marketplace server for performing different activities in accordance with at least one embodiment.

FIG. 4 is a timing diagram 400 indicative of a predetermined time period reserved by the marketplace server 104 for different activities in accordance with at least one embodiment. The timing diagram is described in conjunction with FIG. 1, FIG. 2, and FIG. 3.

The timing diagram 400 includes a task processing period 402 (e.g., time period between $t_1$ and $t_3$ depicted by 402A). Each task processing period 402 includes a time slot 404 (e.g., time period between $t_2$ and $t_3$ depicted by 404A). Hereinafter, the time slot 404 has been interchangeably referred to as time epoch 404. In an embodiment, the processor 202 schedules the one or more tasks on the volunteer computing devices 110 in the time epoch 404. In an embodiment, the processor 202 schedules the one or more tasks for the next task processing period. For example, during time period $t_1$-$t_3$ (depicted by 402A), the volunteer computing devices 110 execute a first set of tasks. In the time period $t_2$-$t_3$ (depicted by 404A), the processor 202 schedules a second set of tasks for the time period $t_3$-$t_5$ (depicted by 402B).

In an embodiment, the processor 202 receives the second set of tasks in the time period $t_2$-$t_3$ (depicted by 404A). In an embodiment, the second set of tasks includes tasks that were not processed in the previous time period $t_1$-$t_3$ (depicted by 402A). In addition, the second set of tasks includes new task requests received from the requester-computing device 102. Further, the processor 202 determines the availability of the one or more computational resources associated with the volunteer computing devices 110 in the time period $t_3$-$t_5$ (depicted by 402B) based on the beacon signal received from the volunteer computing devices 110 and the historical data pertaining to the availability of the one or more computational resources (described in step 302). Based on the availability of the one or more computational resources and the SLA associated with the second set of tasks, the processor 202 determines the cost of executing the second set of tasks (described in step 306). Thereafter, the processor 202 schedules the second set of tasks on the volunteer computing devices 110 based on the cost. The scheduling of the one or more tasks has been described in conjunction with FIG. 6.

A person having ordinary skill in the art would understand that the scope of the disclosure is not limited to having the time epoch 404 as part of task processing period 402. In an embodiment, the time epoch 404 may start after the task processing period 402 expires.

Figure 5:
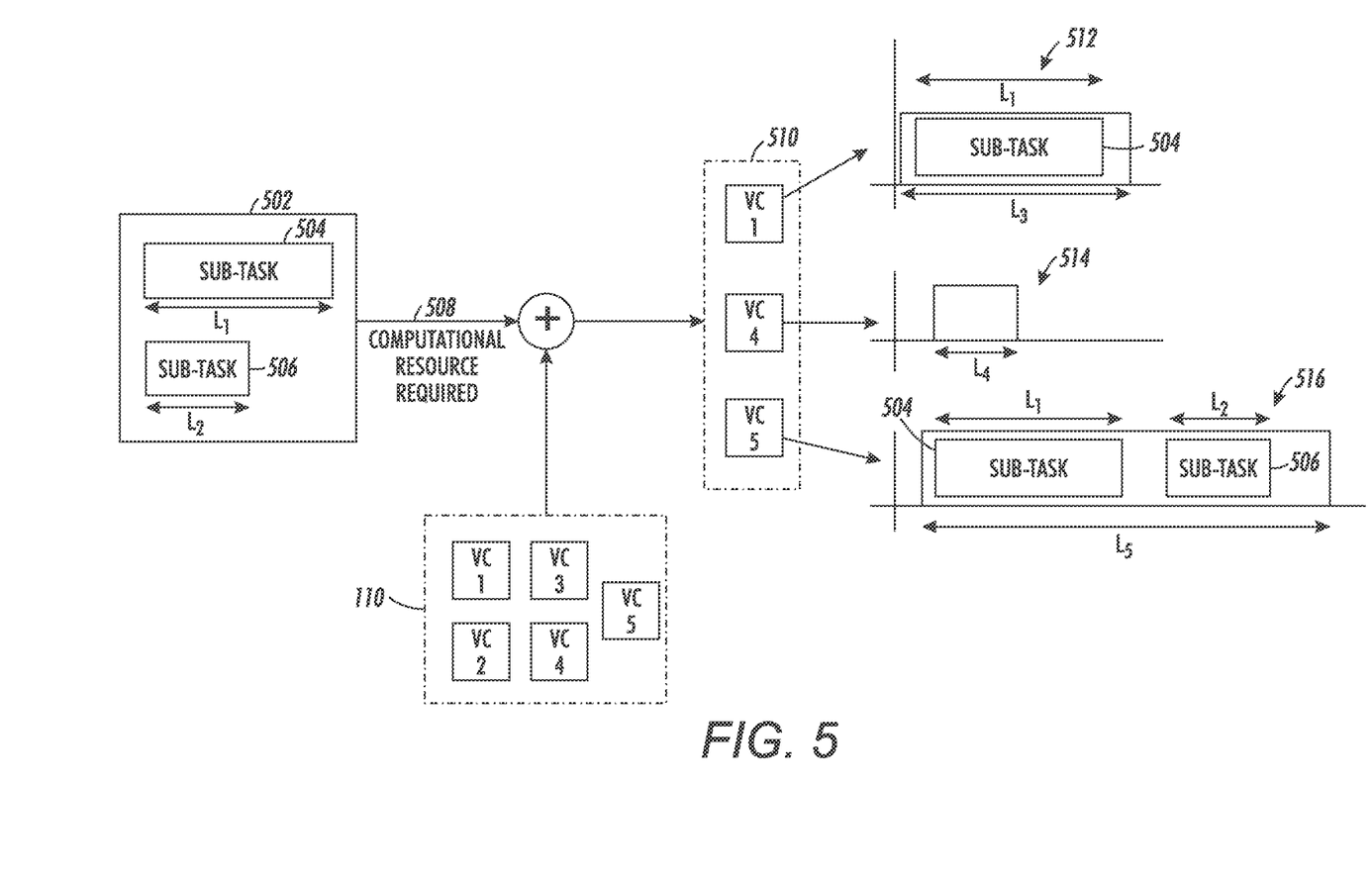
FIG. 5 is a flow diagram illustrating selection of a volunteer computing device from the one or more volunteer computing devices to process a task in accordance with at least one embodiment.

FIG. 5 is a block diagram 500 illustrating identification of the volunteer computing device from the one or more volunteer computing devices 110 in accordance with at least one embodiment. The block diagram 500 has been described in conjunction with FIG. 3.

The block diagram 500 includes a task 502. The task 502 includes two sub-tasks; the first sub-task 504 has to be executed for $L_1$ duration and the second sub-task 506 has to be executed for $L_2$ duration. For instance, the computational resources required to execute the task 502 is 2 GHz processor, 1 GB RAM, and 200 GB hard disk (depicted as computational resource required 508). The processor 202 compares the computational resource required by the task 502 with the configuration of the volunteer computing devices 110 that are available in the next task processing period (depicted by 510). For instance, the volunteer computing devices 110 include VC1, VC2, VC3, VC4, and VC5. Based on the comparison, the processor 202 identifies a first set of volunteer computing devices (depicted by 510) from the volunteer computing devices 110 that satisfy the computational resource requirement criterion of the task 502. For instance, VC1, VC4, and VC5 satisfy the resource requirement criterion.

Thereafter, the processor 202 determines a duration for which the one or more computational resources associated with the first set of volunteer computing devices (depicted by 510) are available in the next processing period. For instance, the one or more computational resources associated with VC1 are available for the duration of L3 (depicted by 512). Similarly, the one or more computational resources associated with VC4 and VC5 are available for duration L4 and L5, respectively (depicted by 514 and 516, respectively). The processor 202 compares the duration to execute the first sub-task 504 and the second sub-task 506 (i.e., L1 and L2 respectively) with the duration for which the one or more computational resources associated with the VC1, VC4, and VC5 are available. In an embodiment, the processor 202 utilizes sliding window technique to compare the durations. Sliding window technique involves fitting duration for which the sub-task needs to be executed, in the duration for which the one or more computational resources are available. If the sub-task fits, the processor 202 selects the respective volunteer computing device. While trying to fit the sub-task, the processor 202 also checks whether the deadline for executing the sub-task is being surpassed. If the deadline for executing sub-task is being surpassed, the volunteer computing device is not selected or discarded.

For example, as L3>L1, the processor 202 selects VC1. Similarly, as L5 is greater than L1+L2, the processor 202 selects VC5. VC5 can execute both the first sub-task 504 and the second sub-task 506. On the other hand, the duration L4 is less than both L1 and L2, thus the VC4 cannot execute the sub-tasks contained in the task 502. Therefore, the processor 202 does not select the VC4. In an embodiment, the volunteer computing devices VC1 and VC5 constitute a second set of volunteer computing devices.

In a scenario, where the one or more computational resources associated with a volunteer computing device has been pre-booked to execute other sub-tasks pertaining to other tasks, the processor 202 determines the duration for which the one or more computational resources are not booked. Based on the duration for which the one or more computational resources are not booked, the processor 202 schedules the one or more sub-tasks. For example, the one or more computational resources associated with the computing device VC1 have been booked for other sub-tasks. For instance, out of L3 duration (for which the one or more computational resources were initially available), the one or more computational resources have been pre-booked for a duration of L6 (not shown). Thus remaining period for which the one or more computational resources are available is L3-L6. Let the time duration L3-L6 be less than time duration L1, greater than the time duration L2. Thus, the processor 202 will be able to accommodate the second sub-task 506, as the one or more computational resources are available for a longer duration than the time required to execute the second sub-task 506. However, the processor 202 may not be able to accommodate the first sub-task 504, as the duration for which the one or more computational resources are available is less than the minimum time required to execute the first sub-task 504.

A person having ordinary skill in the art would understand that the scope of the disclosure is not limited to comparing the duration required to execute the sub-tasks with the duration for which the one or more computational resources are available, by using sliding window technique.

Figure 6:
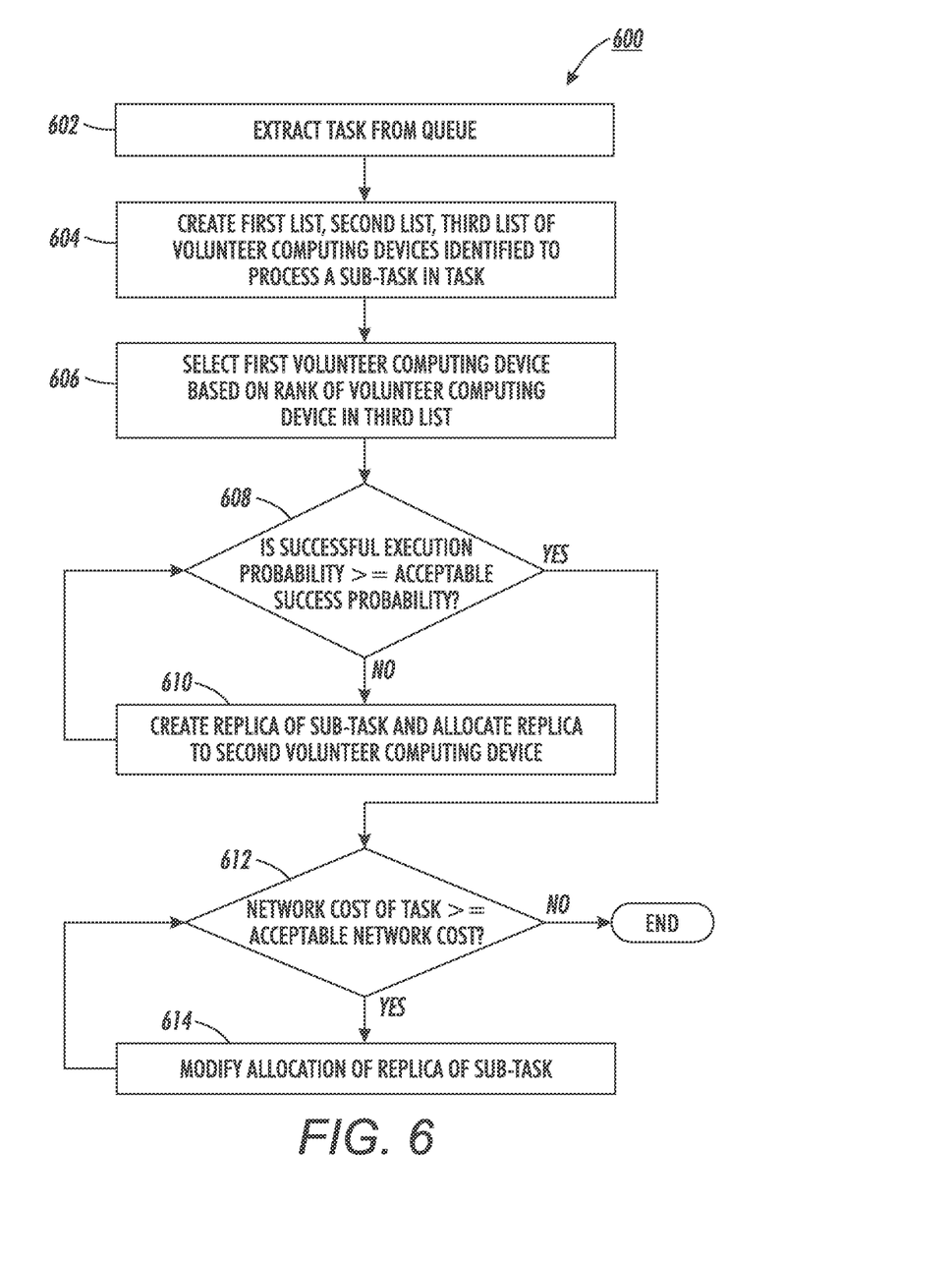
FIG. 6 is a flowchart illustrating a method for scheduling the one or more tasks on the one or more volunteer computing devices in accordance with at least one embodiment.

FIG. 6 is another flowchart 600 illustrating a method for scheduling the one or more tasks on the one or more volunteer computing devices 110, in accordance with at least one embodiment. The flowchart 600 is described in conjunction with FIG. 2, FIG. 3, FIG. 4, and FIG. 5.

As discussed above in conjunction with FIG. 4, the processor 202 receives the second set of tasks at the time epoch 404. The second set of tasks includes one or more tasks that remained unprocessed in the previous task processing period (e.g., $t_1$-$t_3$ depicted by 402A). Further, the second set of tasks includes one or more new tasks received by the processor 202 from the requester-computing device 102 during the previous task processing period. The second set of tasks is stored by the processor 202 in the task queue.

During the time epoch (for example, $t_2$-$t_3$), at step 602, a task is extracted from the task queue. In an embodiment, the processor 202 extracts the task from the task queue. Further, the processor 202 extracts the one or more sub-tasks from the task.

After extracting the one or more sub-tasks, the processor 202 determines the weight associated with each sub-task (as described in step 304). Further, the processor 202 identifies the second set of volunteer computing devices from the volunteer computing devices 110, for each of the one or more sub-tasks, that satisfy the computational resource requirement of the sub-task and is available in the next task processing period (as described in step 306 and FIG. 5). Thereafter, the processor 202 determines the cost to process the one or more sub-tasks on the second set of volunteer computing devices (as described in 306). In an embodiment, the cost includes the network cost and the monetary cost.

For a sub-task from the one or more sub-tasks, at step 604, a first list, a second list and a third list of the second set of volunteer computing devices is created. In an embodiment, the processor 202 creates the first list, the second list, and the third list. In an embodiment, the processor 202 sorts the volunteer computing devices in the second set of volunteer computing devices, in the ascending order of the monetary cost and the network cost to create the first list and the second list, respectively. In an embodiment, the position of the volunteer computing device in the list corresponds to a rank of the volunteer computing device. In addition, the processor 202 creates the third list of the second set of volunteer computing devices by combining the first list and the second list. Following table illustrates the first list, the second list, and the third list:

TABLE 3

Ranks of volunteer computing devices based on monetary cost and network cost

| First List (Monetary cost) | | Second List (Network Cost) | | Third List (Overall Cost; Refer to Equation 2) | |
|---|---|---|---|---|---|
| Rank | Volunteer computing devices | Rank | Volunteer computing devices | Rank | Volunteer computing devices |
| 1 | VC2 | 1 | VC1 | 1.5 | VC3 |
| 2 | VC3 | 2 | VC3 | 2 | VC2 |
| 3 | VC1 | 3 | VC2 | 4 | VC1 |

In an embodiment, the combined rank of the volunteer computing devices is determined based on the weighted sum of the ranks associated with volunteer computing devices in the first list and the second list. In an embodiment, weight for the weighted sum is provided by the requester. In an embodiment, the processor 202 may utilize the following equation to determine the combined rank:

$$\text{Combined rank} = W_m \cdot \text{Rank}_{monetary} + W_n \cdot \text{Rank}_{network} \quad (3)$$

where, $W_m$: Weight associated with monetary rank associated with a volunteer computing device; and $W_n$: Weight associated with network rank associated with the volunteer computing device.

At step 606, a first volunteer computing device is selected from the third list. In an embodiment, the processor 202 selects the first volunteer computing device. In an embodiment, the first volunteer computing device has the best rank compared with the ranks of the other volunteer computing devices in the third list. Thereafter, the processor 202 allocates the sub-task to the selected volunteer computing device to process. In addition, the processor 202 determines a probability of successful execution of the sub-task. Let the probability associated with successful execution of the sub-task be p(k).

At step 608, a check is performed whether the probability of successfully executing the sub-task is less than an acceptable success probability. In an embodiment, the processor 202 performs the check. In an embodiment, the acceptable success probability is provided by the requester. If the probability of successful execution of the sub-task is less than the acceptable success probability, the processor 202 performs the step 610.

At step 610, a replica of the sub-task is created. In an embodiment, the processor 202 creates the replica of the sub-task. Further, the processor 202 allocates the replica of the sub-task to a second volunteer computing device selected from the third list. In an embodiment, the second volunteer computing device is ranked below the first volunteer computing device in the third list (the first volunteer computing device has been selected to execute the original sub-task).

Thereafter, the processor 202 again determines a new probability of successful execution of the sub-task. The processor 202 utilizes the following equation to determine the probability:

$$\text{probability} = 1 - \Pi_{x=1,2,3,\ldots,Z(k)}(1 - p(k,x)) \quad (4)$$

where,

Z(k): The number of replicas of the sub-task; and p(k): Probability of successful execution of the sub-task.

The processor 202 repeats the steps 608 and 610 until the probability of successfully executing the sub-task is greater than or equal to the acceptable success probability. Steps 604-610 are repeated for each sub-task in the task.

After scheduling of each sub-task in the task, at step 612, a check is performed whether the network cost of executing the task is greater than the maximum acceptable network cost mentioned in the SLA. If the network cost of executing the task is greater than the maximum acceptable network cost, the processor 202 performs the check 614. At step 614, the allocation of the replicas of each of the one or more sub-tasks is modified. In an embodiment, the processor 202 modifies the allocation of the replicas.

To modify the allocation of the replicas of the sub-task, the processor 202 determines a relative network cost of each of the one or more sub-tasks in the task. In an embodiment, the processor 202 utilizes the following equation:

$$RN(j) = \left(\frac{\text{subtask network cost}}{\text{task network cost}}\right) / \left(\frac{\text{subtask weight}}{\text{task weight}}\right) \quad (5)$$

Post determining the relative network cost for each of the one or more sub-tasks, the processor 202 selects a sub-task from the one or more sub-tasks that has maximum relative network cost. Thereafter, the processor 202 selects a replica of the selected sub-task, which has been allocated to a volunteer computing device having maximum network cost. The replica is then reallocated to another volunteer computing device that is selected from the third list of the second set of volunteer computing devices. In an embodiment, the selected volunteer computing device is the next best ranked volunteer computing device that has a network cost lower than the previously allocated volunteer computing device. In addition, the selected volunteer computing device must have the bandwidth to process the replica of the sub-task. The bandwidth is determined as described in FIG. 5.

For example, a replica of the sub-task is initially allocated to the VC2 to process. Considering the network cost of task exceeds the maximum allowable network cost, the processor 202 may reallocate the replica of the sub-task to the volunteer computing device VC1, as the volunteer computing device VC1 is next best ranked volunteer computing device in the third list and has the network cost less than the network cost of VC2 (refer the second list).

Based on the modified allocation of the volunteer computing device, the processor 202 determines a new monetary cost, a new network cost, and new overall cost to process the task. Thereafter, the processor 202 repeats the steps 612-614 until the condition in the step 612 is fulfilled.

Similarly, the steps 612 and 614 are performed for the tasks where the network cost of the processing the task exceeds the stipulated network cost listed in the respective SLAs of the tasks.

A person having ordinary skill in the art would understand that the scope of the disclosure is not limited to a volunteer computing infrastructure. In an embodiment, a similar marketplace server 104 can be designed for allocating task to one or more cloud computing infrastructures. An example system environment has been described in conjunction with FIG. 7.

Figure 7:
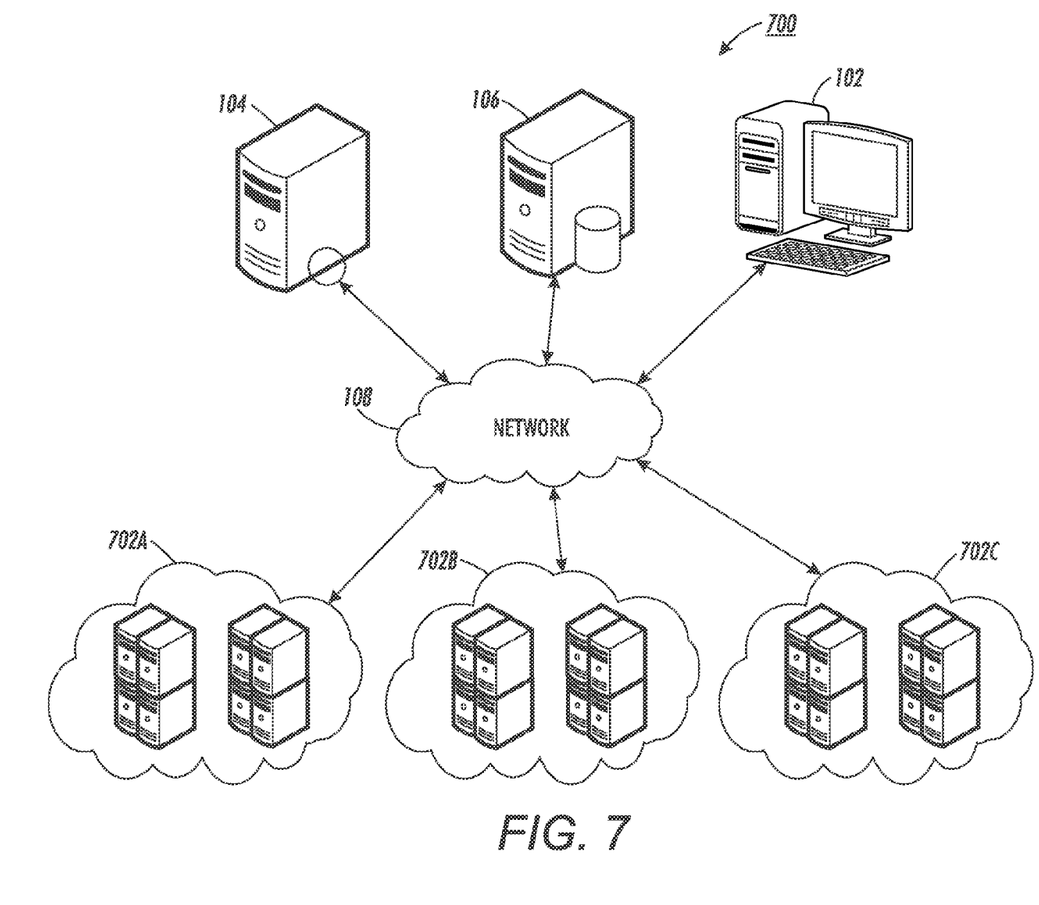
FIG. 7 is a block diagram illustrating a system environment, in which various embodiments can be implemented.

FIG. 7 is a block diagram illustrating a system environment 700, in which various embodiments can be implemented. The system environment 700 includes the requester-computing device 102, the marketplace server 104, the database server 106, the network 108, and one or more cloud computing infrastructures 702A, 702B, and 702C (hereinafter referred as the cloud computing infrastructures 702). The system environment 700 has been described in conjunction with FIG. 2, FIG. 3, FIG. 4, FIG. 5, and FIG. 6.

In an embodiment, each of the cloud computing infrastructures 702 maintains one or more data centers. The cloud computing infrastructures 702 transmit information pertaining to availability of the one or more computational resources on each of the one or more data centers to the marketplace server 104. Further, the cloud computing infrastructures 702 receive the one or more tasks from the marketplace server 104. The cloud computing infrastructures 702 may process the one or more tasks to generate the result, which is transmitted back to the marketplace server 104. Some of the commonly known cloud computing infrastructures may include, Amazon® EC2, Microsoft Azure™, Eucalyptus™, etc.

In operation, the marketplace server 104 receives the one or more tasks from the requester computing device 102. Further, the marketplace server 104 receives information pertaining to the availability of the one or more computational resources from the cloud computing infrastructures 702. In an embodiment, the information is indicative of availability of the one or more computational resources for each of the one or more data centers included in the cloud computing infrastructures 702.

For each of the one or more tasks, the marketplace server 104 determines the cost of executing the one or more tasks on the cloud computing infrastructures 702. In an embodiment, each of the cloud computing infrastructures 702 has a fixed price for using the computational resources. In an embodiment, the cloud computing infrastructures 702 offers the one or more computational resources in form of a virtual machine. Each virtual machine has an associated hourly price. The cost of executing the one or more tasks is determined based on the fixed price. Further, the network cost of associated with execution of the one or more tasks, is dependent upon the location of the data center. For instance, the requestor is located in united states and the data centers associated with a cloud computing infrastructure 702A are located in India and Europe. The network cost of executing the task by using computational resources of data center in India will be more in comparison to using computational resources of data center in Europe.

The overall cost associated with the one or more tasks is determined based on the network cost and the monetary cost. Thereafter, the one or more tasks are scheduled on the cloud computing infrastructures 702 in a similar manner as described in FIG. 6.

The disclosed embodiments encompass numerous advantages. Volunteer computing devices being utilized to execute one or more tasks do not require additional infrastructure. Therefore, the cost of using volunteer computing is much less compared with tasks being executed on the cloud computing infrastructure. The one or more tasks that are to be executed are divided into one or more sub-tasks. Replicas of these sub-tasks are allocated to the one or more volunteer computing devices based on the computational requirements of the task and the availability of the one or more computational resources. As multiple copies of the tasks are executed on numerous volunteer computing devices, the probability of successful execution of the one or more tasks increases. Further, executing the multiple copies of the task provides contingency checks. For instance, if one volunteer computing device fails, another volunteer computing device that has been configured to execute the replica of the sub-task can provide the same result. In addition, the one or more tasks are scheduled on the one or more volunteer computing devices based on the network cost. As the network cost to execute the task is utilized to allocate the tasks to the one or more volunteer computing devices, network delays in transmitting the task and receiving the result are countered. Thus, overall SLA violations are minimized.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the cloud-computing infrastructure for tasks have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for scheduling a task including at least one sub-task, on one or more computing devices in a distributed computing environment, the method comprising:
   identifying, by one or more processors, a set of computing devices from the one or more computing devices, based on an availability of a set of computational resources on the set of computing devices, wherein the set of computational resources are required to execute the at least one sub-task;
   ranking, by the one or more processors, each computing device in the set of computing devices based on weighted sum of ranks associated with a monetary cost and a network cost, associated with the execution of the at least one sub-task on the each computing device; and
   allocating, by the one or more processors, the at least one sub-task to at least one computing device from the set of computing devices for execution based on at least one of the ranking or an acceptable success probability associated with the execution of the at least one sub-task, wherein the acceptable success probability corresponds to a service level agreement parameter associated the task.

2. The method of claim 1 further comprising determining, by the one or more processors, a weight parameter for the at least one sub-task based on at least one of the set of computational resources required to execute the at least one sub-task or a first time duration required to execute the at least one sub-task.

3. The method of claim 2 further comprising determining, by the one or more processors, the ranks associated with the monetary cost and the network cost are based on the corresponding weight parameters.

4. The method of claim 2, wherein the availability of the set of computational resources on the set of computing devices corresponds to a second time duration for which the set of computational resources are available to execute the at least one sub-task, wherein the second time duration is greater than the first time duration.

5. The method of claim 1, wherein the service level agreement associated with the task includes information pertaining to a deadline for completion of the task, a cost of executing the task, and the acceptable success probability of execution of execution of the task.

6. The method of claim 1, wherein the set of computational resources correspond to at least one of a processing unit, a memory, or a storage space.

7. The method of claim 1 further comprising receiving, by the one or more processors, a beacon message from each of the one or more computing devices, wherein the beacon message is indicative of an availability of respective computational resources associated with each of the one or more computing devices.

8. The method of claim 1 further comprising determining, by the one or more processors, an availability of respective computational resources associated with each of the one or more computing devices based on a historical data of the availability of the respective computational resources.

9. The method of claim 1, wherein multiple replicas of the at least one sub-task are allocated to the at least one computing device, wherein execution of the multiple replicas of the at least one sub-task increases a probability of successful execution of the at least one sub-task.

10. The method of claim 9, wherein a number of replicas of the at least one sub-task is determined based on the probability of successful execution of the at least one sub-task and the acceptable success probability.

11. The method of claim 1 further comprising determining, by the one or more processors, an aggregated network cost associated with the execution of the task based on the network cost associated with the execution of the at least one sub-task.

12. The method of claim 11 further comprising modifying, by the one or more processors, the allocation of the at least one sub-task based on the aggregated network cost.

13. A system for scheduling a task including at least one sub-task, on one or more computing devices in a distributed computing environment, the system comprising:
   one or more processors configured to:
   determine a weight parameter for the at least one sub-task based on at least one of a set of computational resources required to execute the at least one sub-task or a first time duration required to execute the at least one sub-task;
   identify a set of computing devices from the one or more computing devices, based on an availability of the set of computational resources on the set of computing devices;
   rank each computing device in the set of computing devices based on weighted sum of ranks associated with a monetary cost and a network cost, associated with the execution of the at leastone sub-task on the each computing device, wherein the ranks associated with the monetary cost and the network cost are determined based on the corresponding weight parameters; and
   allocate the at least one sub-task to at least one computing device from the set of computing devices for execution based on at least one of the ranking or an acceptable success probability associated with the execution of the at least one sub-task, wherein the acceptable success probability corresponds to a service level agreement parameter associated the task.

14. The system of claim 13, wherein the one or more processors are further configured to extract the task from a queue of tasks.

15. The system of claim 13, wherein the availability of the set of computational resources on the set of computing devices corresponds to a second time duration for which the set of computational resources are available to execute the at least one sub-task, wherein the second time duration is greater than the first time duration.

16. The system of claim 13, wherein the service level agreement associated with the task includes information pertaining to a deadline for completion of the task, a cost of execute the task, and the acceptable success probability of execution of the task.

17. The system of claim 13, wherein multiple replicas of the at least one sub-task are allocated to the at least one computing device, wherein execution of the multiple replicas of the at least one sub-task increases a probability of successful execution of the at least one sub-task.

18. The system of claim 17, wherein a number of replicas of the at least one sub-task is determined based on the probability of successful execution of the at least one sub-task and the acceptable success probability.

19. The system of claim 13, wherein the at least one sub-task is executed in a predetermined time period, the predetermined time period being divided into one or more time slots, wherein a chronologically first time slot in the predetermined time period is utilized for scheduling the at least one sub-task.

20. A computer program product for use with a computing device, the computer program product comprising a non-transitory computer readable medium, the non-transitory computer readable medium stores a computer program code for scheduling a task including at least one sub-task, on one or more computing devices in a distributed computing environment, the computer program code is executable by one or more processors in the computing device to:
   identify a set of computing devices from the one or more computing devices, based on an availability of a set of computational resources on the set of computing devices, wherein the set of computational resources are required to execute the at least one sub-task;
   rank each computing device in the set of computing devices based on weighted sum of ranks associated with a monetary cost and a network cost, associated with the execution of the at least one sub-task on the each computing device; and
   allocate the at least one sub-task to at least one computing device from the set of computing devices for execution based on at least one of the ranking or an acceptable success probability associated with the execution of the at least one sub-task, wherein the acceptable success probability corresponds to a service level agreement parameter associated the task.

21. A method for scheduling a task including at least one sub-task, on one ormore cloud computing infrastructures, the method comprising:
   determining, by one or more processors, availability of one or more virtual machines associated with each of the one or more cloud computing infrastructures, wherein the one or more virtual machines are operable to execute the at least one sub-task;
   ranking, by the one or more processors, the one or more virtual machines associated with each of the one or more cloud computing infrastructures based on weighted sum of ranks associated with a monetary cost and a network cost, associated with the execution of the at least one sub-task on the one or more virtual machines; and
   allocating, by the one or more processors, the at least one sub-task to at least one virtual machine from the one or more virtual machines for execution, based on at least one of the ranking or an acceptable success probability associated with the execution of the at least one sub-task, wherein the acceptable success probability corresponds to a service level agreement parameter associated the task.

22. The method of claim 21, wherein the one or more virtual machines are located in different cloud computing infrastructures.

* * * * *